March 20, 1962  S. FRANKFURT  3,026,006
BEVERAGE TAPPING APPARATUS
Filed Sept. 29, 1959  5 Sheets-Sheet 1
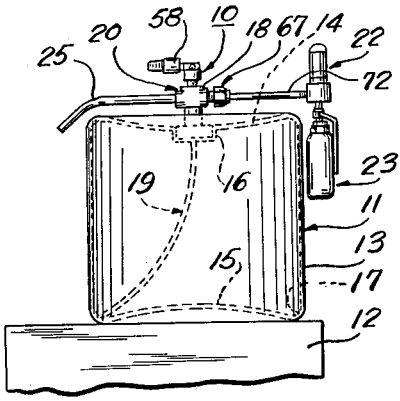
FIG.1
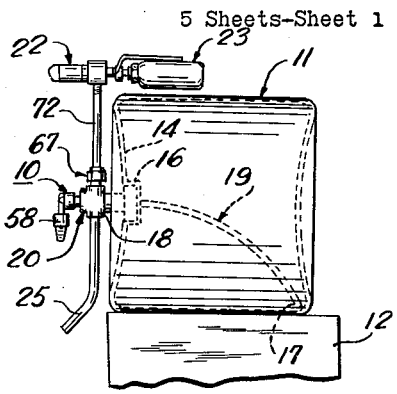
FIG.2
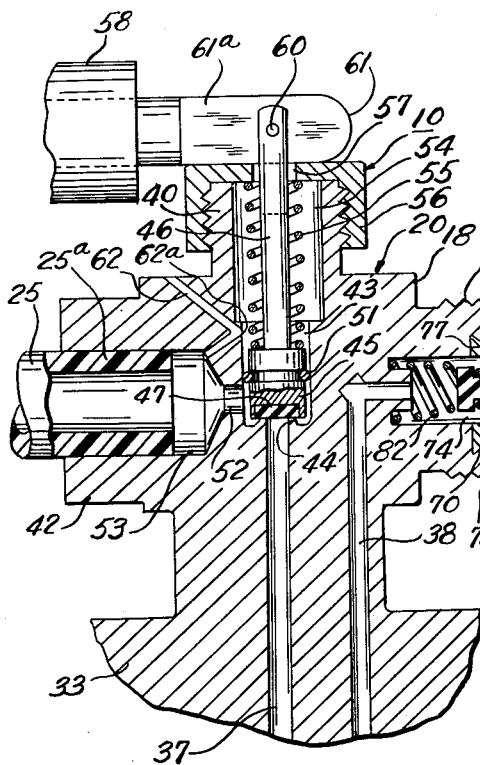
FIG.4
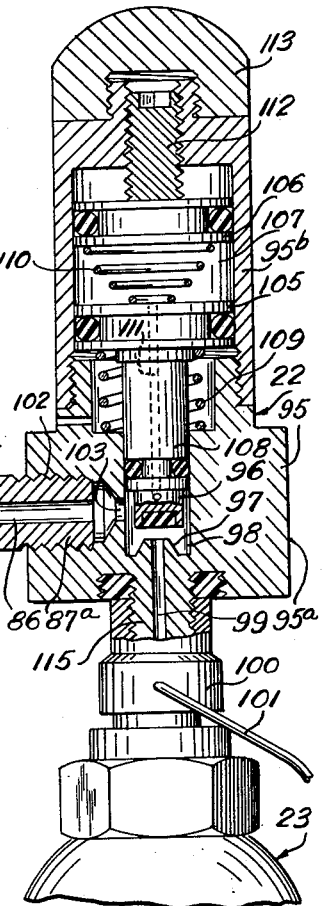
INVENTOR.
SANDOR FRANKFURT
BY Hudson, Boughton,
Williams, David & Hoffman
ATTORNEYS March 20, 1962  S. FRANKFURT  3,026,006
BEVERAGE TAPPING APPARATUS Filed Sept. 29, 1959  5 Sheets-Sheet 2

INVENTOR.
SANDOR FRANKFURT
BY
ATTORNEYS

United States Patent Office 3,026,006
Patented Mar. 20, 1962

3,026,006
BEVERAGE TAPPING APPARATUS
Sandor Frankfurt, University Heights, Ohio, assignor to Home Draught, Inc., Cleveland, Ohio, a corporation of Ohio
Filed Sept. 29, 1959, Ser. No. 843,152
6 Claims. (Cl. 222—400.7)

This invention relates to beverage tapping apparatus of the kind used for drawing or dispensing beverage from a container or keg.

The apparatus of this invention provides for a controlled delivery of beverage from a closed container into which a pressure gas, such as air or carbon dioxide, is introduced for displacing the beverage therefrom. As a source of supply for the pressure gas, the apparatus uses a flask or the like containing a high-pressure charge of such gas and which flask is preferably located on or adjacent the container and is connected therewith through preset pressure regulating valve means so that the pressure of the gas supplied to the container will be automatically maintained at a safe value even though the pressure within the flask may be many times the value of the gas pressure desired in the container.

As one of its objects, the present invention accordingly provides novel apparatus of this kind which is of a simple and practical form capable of being readily manufactured and easily installed, and which is safe and efficient in operation and adaptable to different container positions or locations.

Another object is to provide novel beverage tapping apparatus comprising a fitting or valve body having a beverage discharge passage and also having a draft tube projecting therefrom for insertion into a container, and means for supplying gas under pressure to the container through the fitting or valve body to displace beverage through the discharge passage and which supply means includes valve means comprising preset pressure regulating valve means for maintaining the gas being supplied at a predetermined pressure value.

A further object is to provide novel beverage tapping apparatus of the character mentioned wherein the valve means of the gas pressure supply means comprises or includes check valve means openable toward the container.

Still another object is to provide beverage tapping apparatus comprising a fitting or valve body having a draft tube projecting therefrom, and a pressure gas supply flask or the like connected with such fitting or body through a preset pressure regulating valve means.

It is also an object of this invention to provide a dispensing valve and draft tube combination unit for controlling the discharge of beverage from a container to which gas pressure is supplied through the unit, the said unit being designed to be located at the container and the dispensing valve being a manually operable valve.

Yet another object is to provide a beverage tapping apparatus or unit of the kind referred to above and wherein the draft tube is of a form and construction to more satisfactorily and efficiently achieve the withdrawal of the beverage and, at the same time, reduce to a minimum any tendency to cause agitation, contamination or deterioration of the beverage in the container.

This invention likewise provides a novel beverage tapping device having a draft tube for insertion into a container and such tube having therein a gas supply passage as well as a beverage discharge passage.

Additionally this invention provides novel beverage tapping apparatus of the kind comprising a manually operable dispensing valve and a draft tube projecting therefrom for insertion in a container, the unit having one or more of certain features or characteristics, namely, a free flow of a solid stream of beverage with minimum agitation or turbulence when the dispensing valve is opened, a valve member spring-biased toward a closed position and openable either by manual actuation or automatically by excessive gas pressure in the container, and a delivery spout pivotally connected with the dispensing valve for swinging to different delivery positions.

Other objects and advantages of this invention will be apparent in the following detailed description and in the accompanying drawings forming a part of this specification and in which:

FIG. 1 is a side elevation of beverage tapping apparatus of this invention and showing the same in use on a container occupying an upright position;

FIG. 2 is a similar side elevation but showing the container resting on its side;

FIG. 4 is a fragmentary vertical section corresponding with a portion of the tapping apparatus of FIGS. 1, 2 and 3 and showing the valve mechanism thereof on a still larger scale;

Figure 3:
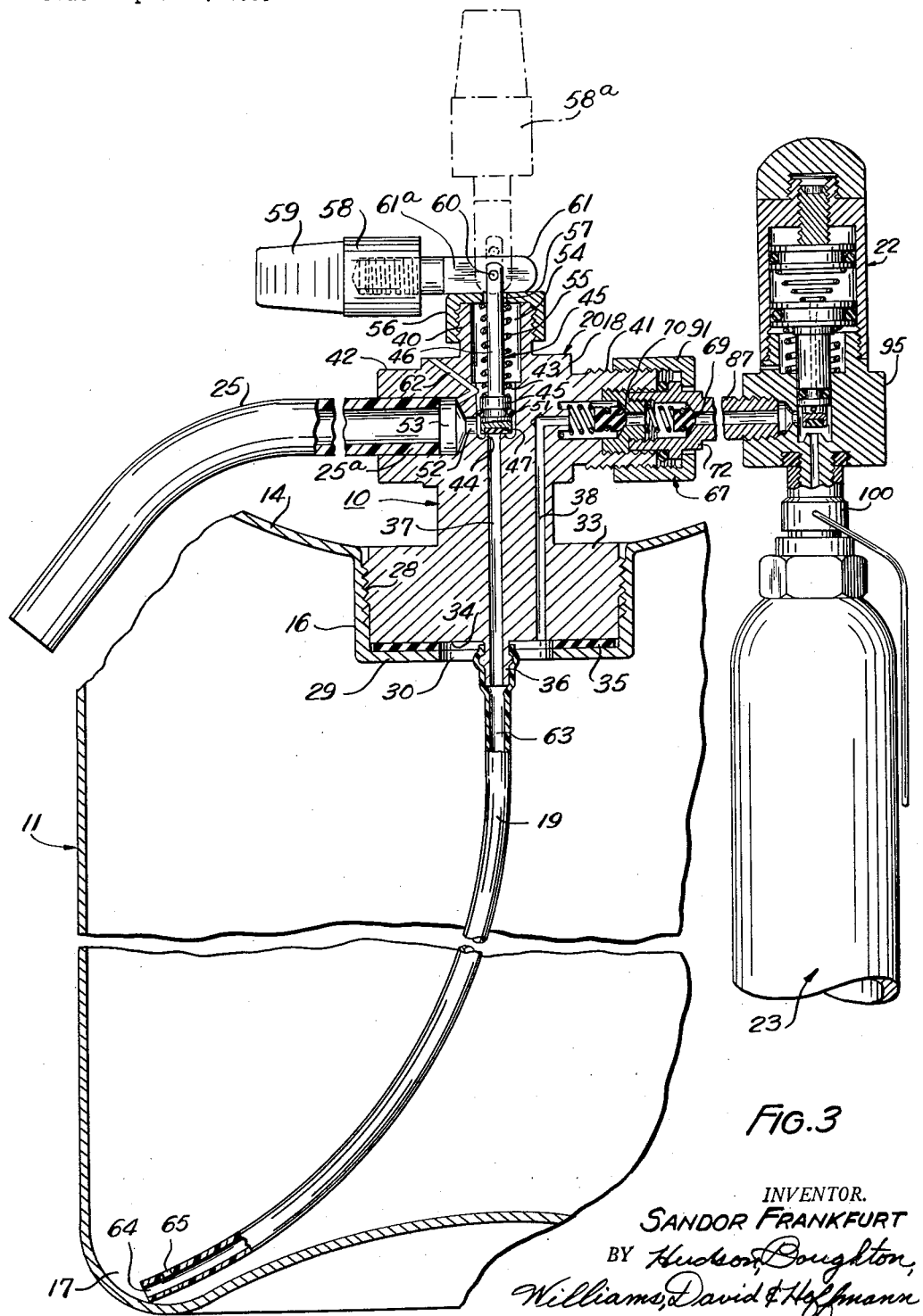
FIG. 3 is mainly a vertical section on a larger scale and taken through the tapping apparatus of FIG. 1 with portions only of the container being shown.

As one practical embodiment of the invention, FIGS. 1 to 4 inclusive show beverage tapping apparatus 10 applied to and mounted on a container 11. The container 11 can be a beverage container of any suitable size and shape and, for example, may be a beer barrel or the like. If desired the container 11 can be a relatively small container, such as a so-called "pony" size beverage container frequently used in homes or for dispensing beverage to members of small private groups of individuals.

When the container is such a small or pony size container it can be readily moved from one location to another and, if desired, can be placed in either an upright position on a support 12 as shown in FIG. 1 or in a horizontal position as shown in FIG. 2, and which latter position is often advantageous for the beverage dispensing operation when the container is being kept in a home refrigerator or the like. The tapping apparatus 10 of this invention is readily usable on a beverage container occupying either such an upright position or such a horizontal position.

The container 11 is of a conventional form of construction, usually a metal-wall container, having an annular side wall 13 and top and bottom or end walls 14 and 15. The top wall 14 is provided with an opening or bung ring 16 affording access to the interior of the container, and the bottom wall 15 is usually a curved or bowed wall whose junction with the side wall 13 defines an internal annular crevice portion or crevice recess 17.

Since the apparatus 10, when used with the container 11, provides for tapping or a tap delivery of beverage from the container, this apparatus is referred to herein as a tap device or tapping apparatus. The tapping apparatus 10 is preferably, though not necessarily, applied to the container 11 by being mounted directly thereon as shown in FIGS. 1 and 2 of athe drawings.

The tapping apparatus 10 comprises, in general, a hollow body 18 and a draft tube or tap rod 19 extending therefrom for insertion into the container 11 through the opening of the bung ring 16. Although the hollow body 18 can be merely a fitting, it is usually the housing of a dispensing valve device 20 and is therefore referred to hereinafter as a valve housing. The tapping apparatus 10 also comprises a preset pressure regulating valve device 22 and a flash or the like, 23 providing a source of supply for pressure gas and connected with the fitting or housing 18 through the preset pressure regulating valve.

When the portion of the tapping apparatus 10 to which the draft tube 19 is connected comprises the dispensing valve device 20, the apparatus also includes a delivery spout 25 projecting from the valve housing 18 and a lever 58 for manually actuating the dispensing valve. As will be further explained hereinafter the delivery spout 25 is a swingable spout which can be readily swung or rotated through a desired angular distance, such as 180°, to locate the same either in the delivery position of FIG. 1 for the delivery of beverage when the container 11 is in an upright position or the delivery position of FIG. 2 when the container 11 is in a horizontal position.

As shown in FIG. 3, the portion of container wall 14 having the bung ring 16 thereon may be formed with the bung ring as an integral portion of such wall. The bung ring 16 may be internally threaded, as indicated at 28, and the bottom wall 29 thereof is provided with an opening 30 leading to the interior of the container 11. The valve housing 18 is shown as having a plug portion 33 which is received in the bung ring 16 for mounting the tapping apparatus 10 on the container 11. The plug portion 33 is externally threaded and when screwed into the bung ring its transverse lower end surface 34 is sealingly pressed against a suitable gasket 35 interposed between such surface and the bottom wall 29 of the bung ring. For a purpose to be explained hereinafter, the plug portion 33 includes an axial nipple projection 36 which is presented toward the interior of the container 11 and is located so as to extend through the opening 30 of the bung ring.

The valve housing 18 is provided with a beverage discharge passage 37 and a gas supply passage 38. This housing is also provided with a first threaded projection 40 coaxial with the beverage discharge passage 37 and a second threaded projection 41 which, in this case, projects in a lateral direction that is from one side of the housing and in a direction substantially normal to the axis of the discharging passage. The housing 18 is preferably also provided with a laterally projecting boss 42 on the side thereof opposite from the threaded projection 41.

The lower or inner end of the discharge passage 37 communicates with the interior of the container 11 through the nipple projection 36, and the outer or upper end of this passage communicates with a valve chamber or recess 43 formed in the housing 18 and located at a point between the threaded projection 41 and the boss 42. An annular valve seat 44 is provided in the housing 18 is surrounding relation to the passage 37 at the point of communication of the latter with the valve chamber 43. The valve seat 44 is engageable by a valve member 45 movable in the valve chamber 43 so that the valve seat and valve member form the valve elements of the dispensing valve device 20.

The valve member 45 is carried and actuated by a valve stem 46 and is provided at its inner end with a packing in the form of a washer 47 or the like which sealingly engages the valve seat 44 when the valve member is in a closed position for interrupting the delivery of beverage from the container 11 through the discharge passage 37. The valve member 45 also carries a packing ring 51 for sealing co-operation with the annular side wall of the valve chamber 43 along an area thereof spaced above the valve seat 44.

The valve chamber 43 is provided, in the side wall thereof, with a short outlet opening 52 which communicates with the inner end of a bore 53 formed in the boss 42. When the dispensing valve device 20 is actuated to its open condition by movement of the valve member 45 away from the valve seat 44, the upper end of the discharge passage 37 is in communication with the bore 53 through the valve chamber 43 and the side opening 52 of the latter, and the flow passage thus provided for the beverage is of good width and cross-sectional area so as to be free and unobstructed. The open position of the valve member 45 permits a free flow of beverage from the container 11 through the discharge passage 37, and through the delivery spout 25 which is connected with the housing 18 by having its inner end 25ᵃ inserted into the bore 53. The flow of the beverage will, when the beverage is of a proper temperature, be in the form of a stream of solid liquid and will not be agitated or turbulated into a frothy condition.

The delivery spout 25 is made of plastic or any other suitable material of an inexpensive character and can be discarded when the container 11 is empty. The spout 25 can be readily detached from the valve housing 18 by withdrawal from a transverse counterbore 53 in which the end portion 25ᵃ is swively received.

An axial counterbore 54 of the housing 18 forms, with the valve chamber 43, a spring chamber in which a compression spring 55 is located in a surrounding relation to the valve stem 46. The counterbore 54 is closed or substantially closed at its upper end by a cup-shaped cover member or nut 56 having a threaded connection with the projection 40. The transverse wall of the cover member 56 is provided with a central opening 57 through which the valve stem 46 extends and in which this valve stem is guided during the axial valve-actuating movements thereof. The transverse wall of the cover member 56 also forms a seat for the outer end of the spring 55.

The valve member 45 is normally in a valve-closed position in engagement with the valve seat 44 and is biased toward this valve-closed position by the spring 55. Opening movement is imparted to the valve member 45 through the stem 46 by a pulling force acting in opposition to the spring 55 and, in this case, supplied by a swingable actuating member or lever 58 having a handle portion or member 59 thereon. The actuating member 58 is connected with the upper end of the valve stem 47 by a transverse pivot pin 60 and, adjacent the pivot pin, is provided with a cam-shaped thrust portion 61 which, in this case, is a rounded portion formed on the free end which extends beyond the pivot pin.

The actuating member 58 is shown in FIGS. 1 and 3 in full lines in a horizontal position corresponding with the closed condition of the dispensing valve device 20. The actuating member 58 is swingable on the pivot pin 60 to the elevated broken-line position 58ᵃ of FIG. 3 which corresponds with the valve-open position of the valve member 45. During the swinging of the actuating member 58 from its full-line position to the phantom position 58ᵃ, the cam portion 61 rockingly presses against the top surface of the cover member 56 thereby causing the valve-opening pulling force to be applied to the stem 47 in opposition to the spring 55. The portion of the actuating member 58 through which the pivot pin 60 extends is here shown as a blade portion 61ᵃ which is received in a slot provided in the upper end of the valve stem 47.

Since the valve member 45 is biased toward its closed position by the spring 55 and the valve stem 46 is freely movable through the opening 57 of the cover member 56, the valve device 20 also serves as a pressure relief valve for automatically relieving any excessive or unsafe pressure condition which may occur in the container 11. Thus, upon the occurrence of any abnormal pressure in the container 11, the valve member 45 will be lifted against the opposing force of the spring 55 to thereby vent the excessive pressure to atmosphere.

To obtain complete drainage of beverage from the spout 25, the housing 18 is provided with a vent passage 62 of a restricted size for connecting the bore 53 with the atmosphere. The passage 62 is an L-shaped passage (see FIGS. 3 and 4) which, at the heel portion thereof, communicates with the valve chamber 43 through a port 62ª in the side wall of the latter. The spacing of the port 62ª above the valve seat 44 is so related to the travel member 45 that, when the valve member is in its open position, the packing ring 51 thereof will cover the port and prevent the escape of beverage through the vent passage 62 but, when the valve member is in its closed position as shown in FIGS. 3 and 4, the port will be uncovered and the vent passage will then connect the bore 53 with atmosphere.

In the tapping apparatus 10, the draft tube 19 is connected to the housing 18 so that the passage 63 of the tube forms an inlet passage portion and extends the beverage discharge passage 37 into the container 11. The tube 19 is shown as being a flexible tube which can be made of plastic or any other suitable material of a flexible or elastic character. The flexible character of this tube permits the same to be attached to the housing 18 by forcing the upper end of the tube into a surrounding and gripping relation to the nipple projection 36. The draft tube 19 is of a length to extend to the bottom of the container 11 and its lower end is in open communication with the interior of the container, as through an end opening 64 and one or more side openings 65.

The flexible character of the draft tube 19 also permits the same to assume a bowed or curved position, as shown in FIG. 3, in which the lower end of this tube reaches into the internal crevice 17 of the container 11 so as to locate the intake openings 64 and 65 of the tube at the lowest point of the container. Since the draft tube 19 is made of plastic or the like and is flexible in character it will be relatively inexpensive and can be discarded when the container 11 has been emptied, thus simplifying the procedure of cleaning the tapping apparatus. The gripping engagement of the distended upper end portion of the tube 19 with the nipple projection 36 permits the tube to be readily disengaged from the housing 18.

The inner end of the gas supply passage 38 of the housing 18 opens through the inner face 34 of the plug portion 33 and is located so that it communicates directly with the interior of the container 11 through the opening 30 of the bung ring 16. The outer or upper end of the gas supply passage 38 is connected with the supply flask 23 to receive pressure gas therefrom through the preset pressure regulating valve device 22 and through check valve means 67 comprising a pair of first and second check valves 69 and 70.

The first or outer check valve 69 is located in an outer check valve chamber 71 formed by co-operating portions of an adapter member 72 and a bushing 73. The second or inner check valve 70 is located in an inner or second check valve chamber 74 formed by co-operating portions of the bushing 73 and the threaded projection 41. The check valves 69 and 70 open toward the interior of the container 11 to permit a flow of the pressure gas thereinto through the supply passage 38 and are in a series relation in this passage for a safety purpose to be explained hereinafter.

The threaded projection 41 of the housing 18 is provided with an inner axial bore in communication with the outer end of the supply passage 38 and which forms the inner or major portion of the check valve chamber 74. The threaded projection 41 is also provided with a counterbore 75 which is internally threaded as indicated at 76. The bushing 73 comprises ring portions 77 and 78 of relatively large and relatively small diameters and both of which ring portions are externally threaded. The ring portion 77 of the bushing 73 is screwed into counterbore 75 and carries an annular valve seat 80 surrounding an axial connecting passage 81 provided in this bushing.

The annular seat 80 faces toward the check valve chamber 74 and forms a check valve seat for the check valve 70 and against which the latter is pressed by a compression spring 82 located in this check valve chamber. The check valve 70 is operably supported in the check valve chamber 74 by the spring 82 whose outer end portion is connected with this check valve by being engaged in the groove thereof. The spring 82 carrying the check valve 70 is, of course, inserted into the check valve chamber 74 prior to the assembly of the bushing 73 into the counterbore 75 of the projection 41.

The adapter 72 is provided at the inner end thereof with a cylindrical sleeve 84 having an internal thread by which such sleeve is attached to the threaded ring portion 78 of the bushing 73. A bore in the adapter sleeve 84 forms the check valve chamber 71 and is provided at the outer end thereof with an annular seat 85 forming a check valve seat facing the check valve chamber 71 and disposed in a surrounding relation to a passage 86 extending axially through an outer stem portion 87 of the adapter. The check valve 69 is biased toward the seat 85 by a compression spring 88 which is located in the check valve chamber 71 and supports this check valve in an operative position therein. For a purpose to be presently explained, the outer end of the adapter stem 87 is provided with a threaded portion 87ª.

At a point adjacent the junction of the stem portion 87 with the sleeve portion 84, the adapter 72 is provided with a radial annular flange 90 forming a clamping shoulder. The adapter 72 is connected with the projection 41 by the bushing 73 and also by means of a cup-shaped nut or coupling member 91. In attaching the adapter member 72 to the projection 41, the sleeve portion 84 is inserted into the counterbore 75 and screwed onto the ring portion 78 of the bushing 73 with a packing ring 92 interposed between the flange 90 and the outer end of the projection. Thereafter, the coupling member 91 is screwed onto the projection 41 by applying clamping pressure to the flange 90 to thereby strengthen the connection of the adapter member with the projection and to also prevent loosening of the parts. The spring 88 carrying the check valve 69 is, of course, placed in the chamber 71 before the sleeve portion 84 is inserted into the counterbore 75.

The preset pressure regulating valve device 22 is of a conventional construction and operates to supply pressure gas from the flask 23 to the gas supply passage 38 at a pressure value which is relatively reduced with respect to the pressure usually existing in the flask and which reduced pressure value is a safe value for use in the container 11. The valve device 22 comprises a housing 95 formed by connected housing sections 95ª and 95ᵇ, and co-operating valve and valve seat members 96 and 97 located in a valve chamber 98 of the housing section 95ª.

The co-operating valve and valve seat members 96 and 97 control the flow of pressure gas from the flask into the valve chamber 98 through an inlet passage 99 leading from the flask and which, in turn, is controlled by a shut-off valve device 100 having an actuating lever or handle 101. The housing section 95ª is provided with an outlet passage in the form of a threaded recess or socket 102 which is in communication with the valve chamber 98 through a side connecting opening 103 of the latter.

The preset pressure regulating valve device 22 also comprises a pair of axially spaced pistons 105 and 106 located in the housing section 95ᵇ and of which the innermost piston 105 is connected with the valve member 96 by a valve stem 108. An inner compression spring 109 surrounding the valve stem 108 is disposed between the housing section 95 and the inner piston 105. The outer piston 106 is a free piston which co-operates with the inner piston to form a control chamber 107 in the housing section 95ᵇ. A second compression spring 110 is located between the pistons 105 and 106 by being disposed in the control chamber 107. The control chamber 107 is in communication with the valve chamber 98 through a restricted axial passage 111 of the valve stem 108.

The compression of the spring 110 is adjustable by means of an adjusting screw 112 extending through a threaded opening in the outer end of the housing section 95ᵇ and engaging the outer piston 106. The adjusting screw 112 is normally covered and concealed by a cap 113 threadedly attached to the outer end of the housing section 95ᵇ.

From the extent to which the pressure regulating valve device 22 has been described above it will be recognized that this device is of a conventional form and will operate to supply pressure gas from the flask 23 to the supply passage 38 whenever the shut-off valve 100 has been opened and will automatically maintain the pressure of the gas in the supply passage 38 and in the interior of the container 11 at a desired predetermined value in accordance with the adjustment setting of the adjusting screw 112. The valve device 22 is so constructed that when it has been assembled at the factory and the adjusting screw 112 has been set at the rated pressure value for which this valve device is intended to be sold and used, the screw 112 will no longer be readily accessible by unauthorized persons so that this valve device will not be subsequently or inadvertently adjusted to a pressure value setting higher than its rated setting and such as might likely produce a dangerously high pressure in the container with which the valve device is used.

The flask 23 is detachably connected with the pressure regulating valve device 22 and, for this purpose, the valve device is provided at the bottom thereof with a threaded nipple 115 on to which a portion of the shut-off valve 100 is screwed as shown in FIG. 4. The pressure regulating valve device 22 is, in turn, mounted on the stem 87 of the adapter 72 by being screwed onto the threaded stem portion 87ᵃ. With the assembly arrangement thus provided for the tapping apparatus 10 it will be seen that this apparatus can be mounted directly on the container 11 so as to be supported thereby for movement with the container when the latter is shifted from one location to another or from one position to another. When the tapping apparatus 10 is thus mounted on the container 11, the pressure regulating valve device 22 will be supported by the stem 87 of the adapter 72 and will in turn support the flask 23 in a manner such that the flask can be readily disconnected from the apparatus.

It is intended that when the flask 23 becomes empty it will be disconnected from the tapping apparatus 10 by unscrewing the same from the threaded nipple 115 of the valve device 22. There is a possibility, however, that an inexperienced user of the tapping apparatus 10 might disconnect the empty flask 23 by detaching the adapter 72 from the housing 18. The construction and assembly of the check valve means 67 is such that if the flask 23 is detached in this improper manner, a hazardous condition will not result nor will the gas pressure in the container 11 be vented because the bushing 73 and inner check valve 70 will still remain in place and the latter will prevent such venting of pressure from the interior of the container.

Figure 5:
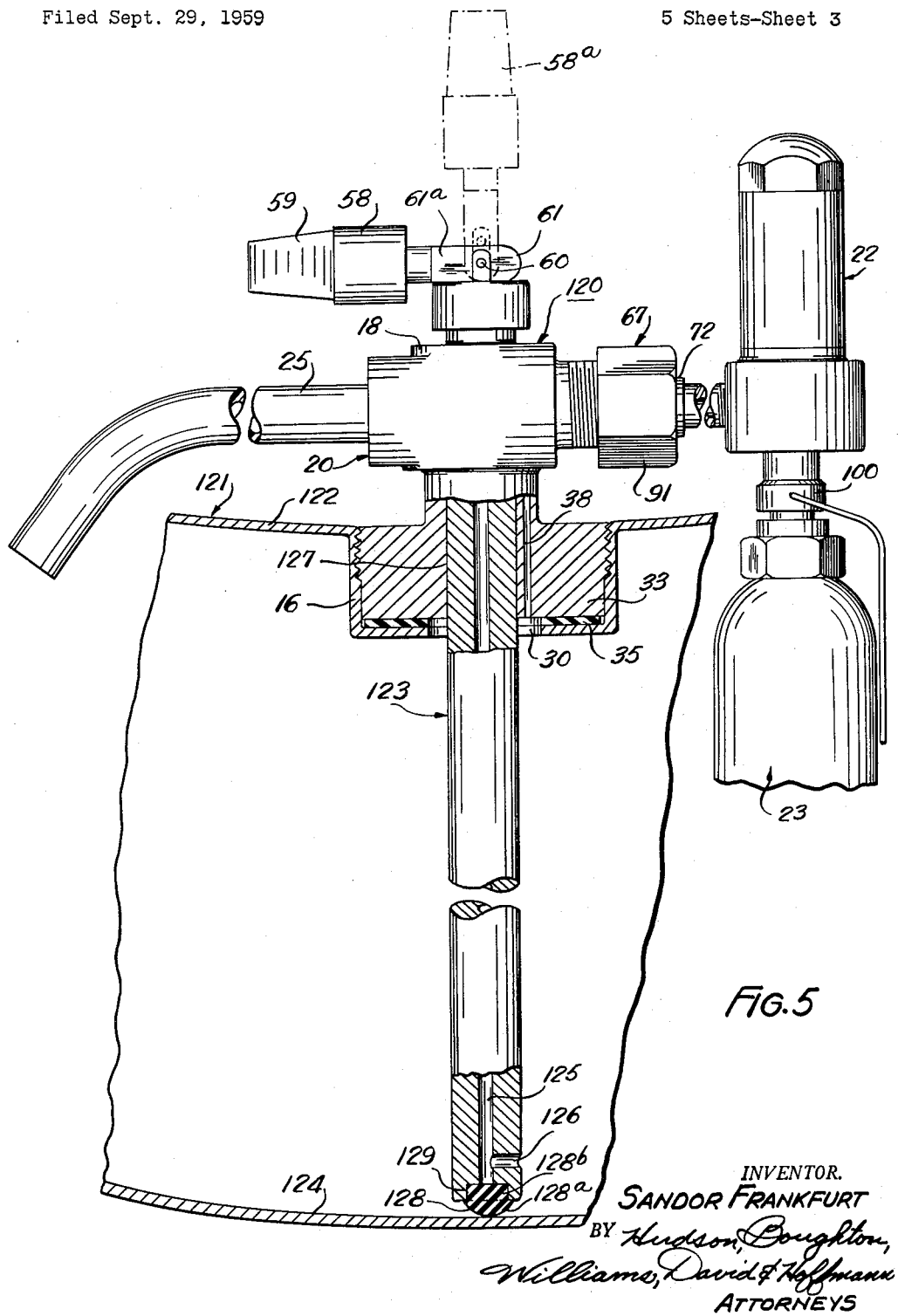
FIG. 5 is a vertical section similar to that of FIG. 3 but showing a modified form of beverage tapping apparatus.

FIG. 5 of the drawings shows tapping apparatus 120 which is generally similar to the above described tapping apparatus 10 but which represents a modified construction. The tapping apparatus 120 is here shown as applied to a container or barrel 121 by attachment to a bung ring 16 carried by the top wall 122 of such container. The tapping apparatus 120 comprises the same components as the tapping apparatus 10 and to which the same reference characters have been applied, but the modified apparatus is provided with a draft tube 123 of a different form.

The draft tube 123 comprises a rigid or semirigid rod of a length to extend into the container 121 to the bottom wall 124 thereof or to a point adjacent such bottom wall. The draft tube 123 can be made of any suitable material such as plastic or metal, preferably the latter, and in provided with a central axial passage 125 forming an extension of the inlet end of the beverage discharge passage of the dispensing valve 20. The passage 125 communicates with the interior of the container through a radial connecting passage 126 provided in the tube at a point adjacent its lower end. The tube 123 is suitably connected with the valve housing 18 as by having its upper end assembled into an opening or counterbore recess 127 which extends into the housing through the plug portion 33 thereof.

The draft tube 123 is provided at the inner or lower end thereof with a cushioning and insulating contact member 128 which serves to cushion any accidental engagement or bumping of the inner end of the tap rod against the bottom wall 124 of the container so as to prevent damage or scratching by such accidental engagement. The contact member 128 is yieldable in character and is of a button-like form having a rounded head portion 128ᵃ and a stem portion 128ᵇ engaged in a counterbore 129 of the tube 123 for mounting the contact member thereon. The contact member 128 can be made of rubber or of a rubber-like or plastic material so that, in addition to being yieldable, it will also be electrically insulating in character and will isolate or insulate the lower end of the draft tube 123 from electrical connection with the container wall 124 to minimize or prevent the harmful effects of electrolysis.

The modified tapping apparatus 120 described above is usable in a manner generally similar to the tapping apparatus 10 for the accomplishment of the same useful purposes and advantageous results.

Figure 6:
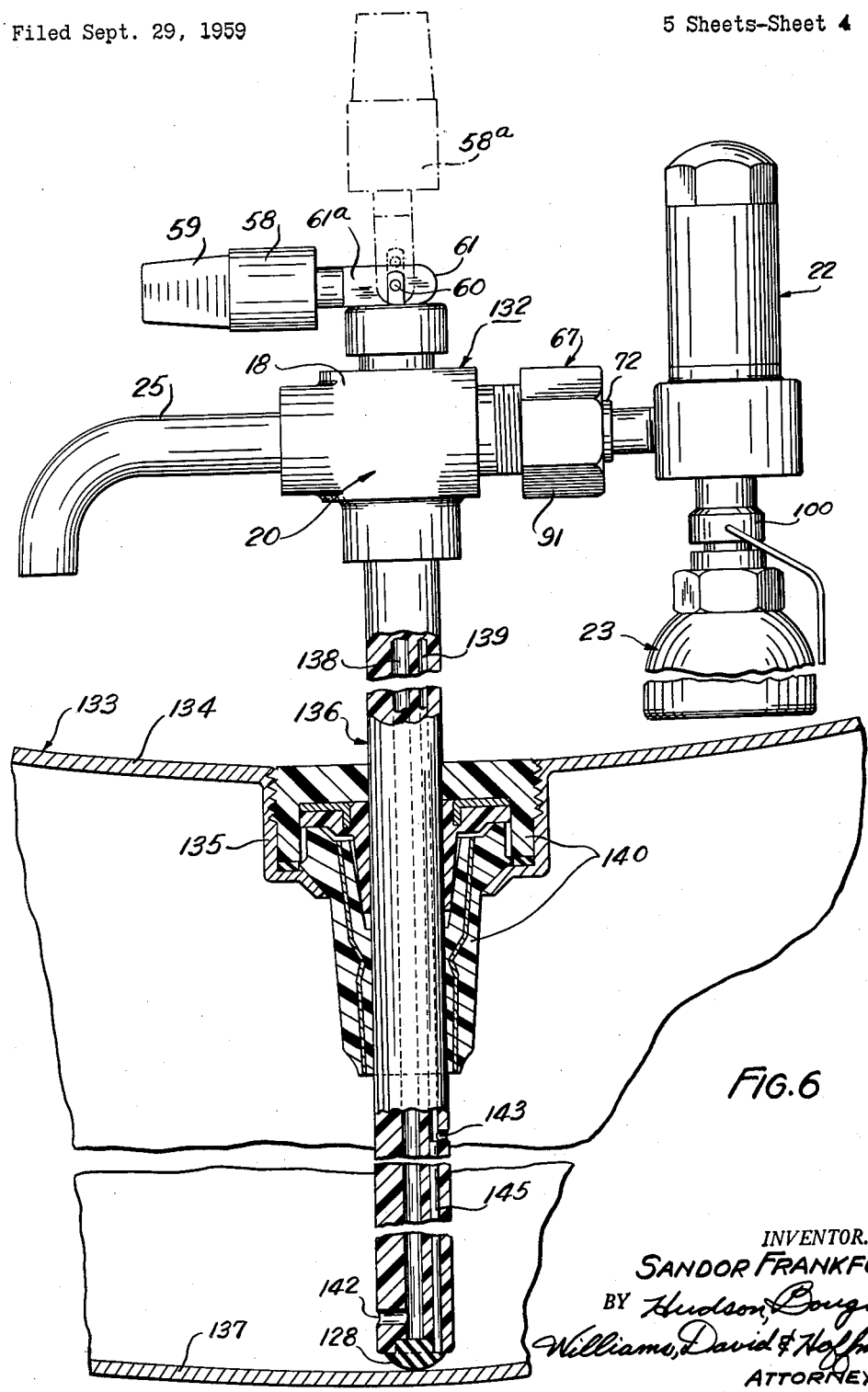
FIG. 6 is another such vertical section showing a second modified form of beverage tapping apparatus.

FIG. 6 of the drawings shows tapping apparatus 132 of a form generally similar to the above described apparatus 10 and 120 but which represents another modified construction. The tapping apparatus 132 is here shown applied to a beverage container or barrel 133 having a top wall 134 carrying a bung ring 135. The modified tapping apparatus 132 comprises, in general, the same components as the tapping apparatus 10 and 120 and the same reference numerals have been applied thereto but includes a draft tube 136 of a different form and the plug portion 33 has been omitted from the valve housing 18.

The draft tube 136 comprises a rigid or semirigid rod made of suitable material such as metal or plastic, preferably the latter. The draft tube 136 is of a length to extend into the container 133 to the bottom wall 137 or to a point adjacent such bottom wall and is provided with a plurality of axial passages, in this case, a beverage passage 138 and a gas supply passage 139.

When the tapping apparatus 132 is applied to the container 133, the valve housing 18 is not connected directly to the container but the tapping apparatus is supported by the container by reason of the rigid character of the draft tube 136 extending thereinto through a self-sealing closure device 140 provided in the bung ring 135. The closure device 140 is of a conventional form and is of the type which will permit the draft tube 136 to be inserted therethrough into the container 133 and will automatically assume a closed condition when the draft tube is withdrawn from the container through such closure device. The length of the draft tube 136 is also such as to locate the dispensing valve 20 an appropriate distance above the top wall 134 of the container.

The plastic material of which the draft tube 136 is made is one which can be molded or extruded, and the draft tube is here shown as being an extrusion product in which the passages 138 and 139 are preformed, that is, are formed in the tube during the extruding thereof. The beverage passage 138 communicates with the interior of the container 133 through a radial connecting passage 142 provided in the tube adjacent its lower end. The gas supply passage 139 includes a radial outlet or connecting passage 143 which communicates with the interior of the container and is located on the draft tube 136 at an intermediate point of its length such that this connecting passage will be adjacent to, but spaced from, the inner end of the closure device 140 when the tapping apparatus 132 has been assembled on the container 133. When the connecting passage 143 is in this location the pressure gas entering the container will rise through only a minimum height of the beverage standing in the container, and accordingly, the pressure gas will not cause undue agitation or frothing of the beverage.

During the formation of the draft tube 136 as an extrusion product as mentioned above, the passages 138 and 139 are so formed that they extend in a parallel relation through the tube for the full length thereof. The transverse connecting passage 143 is drilled or otherwise formed in the draft tube 136 to communicate with the axial passage 139 at the desired location on the tube. The portion of the passage 139 extending below the connecting passage 143 is an unused passage portion and is preferably closed by plugging thereof as by means of an insert plug or stem 145. The draft tube 136 is preferably provided at the lower end thereof with a contact member of the same form as the above described contact member 128 and which provides for a yieldable engagement with the bottom wall 137 of the container.

Figure 7:
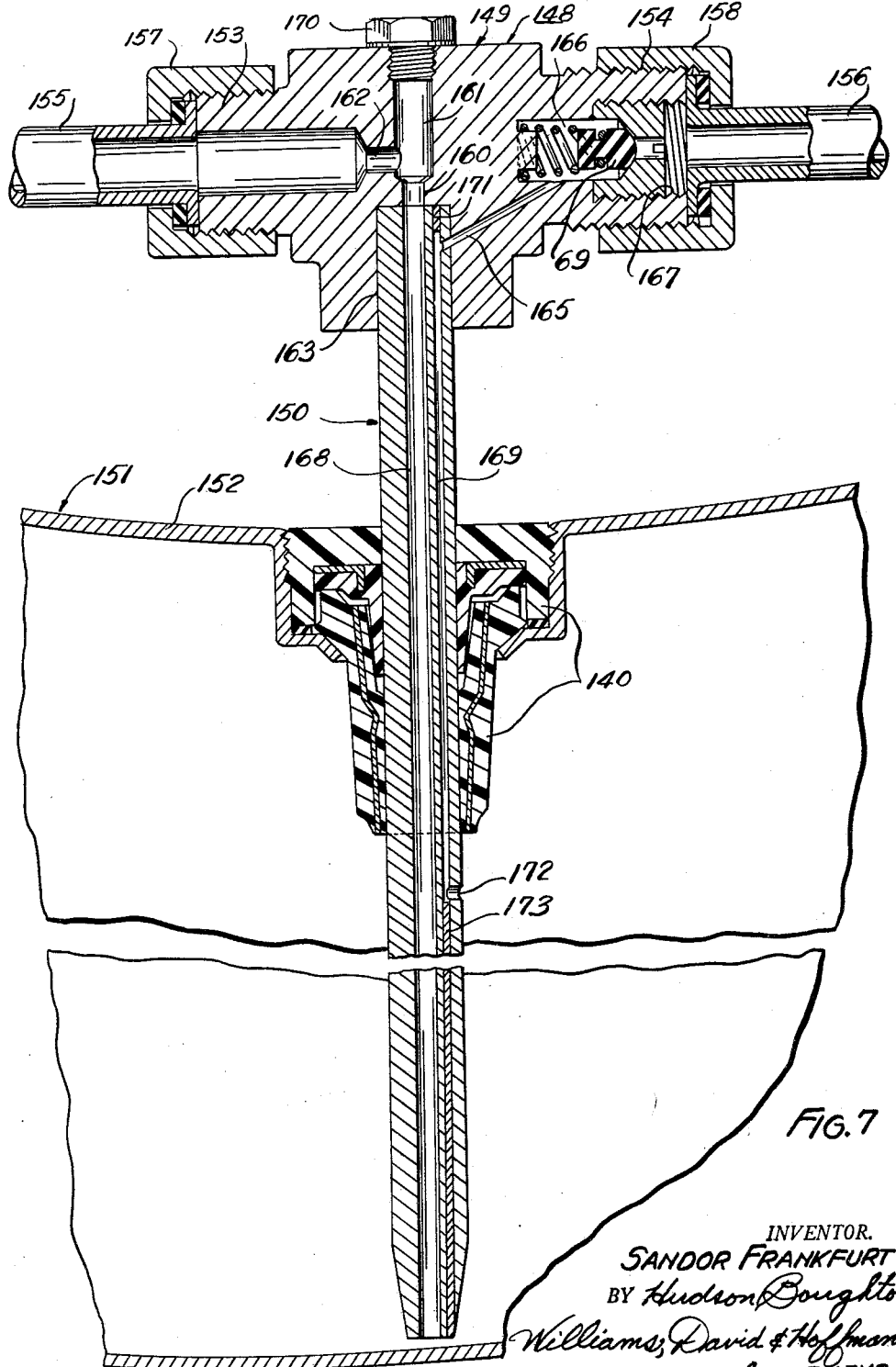
FIG. 7 is still another such vertical section showing a third modified tap device which is of a more simplified form.

FIG. 7 of the drawings shows a more simplified form of tap device 148 comprising a housing or fitting 149 and a draft tube or tap rod 150 projecting from the housing for insertion into a beverage container 151 through a self-sealing closure device 140 of the container wall 152. The housing 149 has threaded projections 153 and 154 to which a beverage delivery conduit 155 and a gas pressure supply conduit 156 are connected, respectively, as by means of couplings 157 and 158.

The housing 149 has a beverage discharge passage 160 therein which is formed by the lower end portion of a through axial passage 161 and a transverse passage 162 located in the projection 153 and forming a side outlet of the through passage. The housing 149 also has an axial counterbore 163 therein at the lower end of the through passage 161. Additionally, the housing 149 has a gas supply passage 165 drilled therein in an inclined relation to the passage or bore 166 of the projection 154. The projection 154 is also provided with an internally threaded counterbore 167.

The draft tube 150 comprises a substantially rigid rod having parallel axial passages 168 and 169 therein and is connected with the housing 149 by having its upper end suitably secured in the counterbore 163. The passage 168 of the draft tube 150 is aligned with the through passage 161 of the housing 149 and extends the beverage discharge passage 160 into the container 151. The through passage 161 is closed at its upper end by a screw plug 170 whose removal permits easy cleaning of the passages of the device.

The gas supply passage 165 is preferably drilled after the draft tube has been connected to the housing 149 and connects with the gas delivery passage 169 at a point spaced a short distance below the upper end of the draft tube. The portion of the passage 169 extending above the junction point of the passage 165 therewith is an unused passage portion and is plugged by a rod or the like 171 inserted thereinto. The gas supply passage 165 is controlled by a check valve assembly located in the threaded counterbore 167 and containing an inwardly opening check valve 69.

The gas supply delivery passage 169 communicates with the interior of the container 151 through a radial connecting passage 172 located at an intermediate point of the length of the draft tube 150 and corresponding with the connecting passage 143 of the tap device 132 of FIG. 6. The portion of the passage 169 extending below the connecting passage 172 is an unused passage portion and is plugged by a rod or the like 173 inserted thereinto.

The housing 149 and the draft tube 150 can be made of metal and, in that case, the passages 168 and 169 can be drilled passages. When the draft tube 150 is of metal, it can be fitted with an insulating contact member of the form and mounting shown in FIG. 6 for the member 128, so as to prevent or minimize the action of electrolysis. The housing 149 and draft tube 150 can, if desired, be made of a suitable plastic material in which case the passages 168 and 169 can be formed in the draft tube during the molding or extruding thereof.

Since the beverage passage 168 of the draft tube 150 is axially aligned with the through passage 161 of the housing 149, it will be recognized that cleaning of the tap device 148 and particularly of the passage 168 of the draft tube, can be easily accomplished. Thus, when the beverage container 151 is empty and the tap device 148 is withdrawn therefrom for cleaning, the removal of the closure plug 170 affords direct access to the beverage passages of the housing and draft tube.

The tap device 148 can be used in various installations of which one practical form is where the gas supply conduit 156 extends to a flask or other suitable source of gas pressure and the beverage delivery conduit 155 extends to a dispensing valve or faucet.

From the accompanying drawings and the foregoing detailed description it will now be readily understood that this invention provides novel tapping apparatus for use on beverage containers for obtaining a controlled discharge of beverage therefrom by the action of pressure gas supplied to the container. The novel tapping apparatus makes use of a supply of pressure gas in a readily detachable flask and provides for the convenient withdrawal of the beverage from the container under the control of a dispensing valve, and also provides for maintaining a substantially uniform safe pressure value for the pressure gas being supplied to the container from the flask. Since many of the novel features and advantages of this tapping apparatus have already been pointed out in the foregoing detailed specification, they need not be further summarized at this point.

Although the tapping apparatus of this invention has been illustrated and described herein to a somewhat detailed extent it will be understood, of course, that the invention is not to be regarded as being correspondingly limited in scope but includes all changes and modifications coming within the terms of the claims hereof.

Having described my invention, I claim:

1. A tap device for use on a beverage container having an opening in the wall thereof and a closure device of the self-sealing type in said opening, comprising a housing having a through axial passage including a cleanout opening at the outer end of said through passage and a threaded portion surrounding the cleanout opening; a draft tube comprising a single tube member and being disposed in axial alignment with said through passage and projecting from said housing; said draft tube being rigid for insertion into said container through said wall opening and closure device and itself having a pair of parallel longitudinal passages formed directly therein as a gas passage and a beverage passage and being otherwise solid transversely thereof, and a port connected with the gas passage and located in the side of said draft tube at an intermediate point of its length; said housing having a pair of projections extending laterally outward therefrom on opposite sides of said through passage substantially perpendicular to the axis of the latter and provided respectively with gas pressure inlet and beverage discharge passages in communication with the gas and beverage passages of said draft tube; said draft tube having one end thereof engaged in the inner end of said through passage and connected with said housing so that said beverage passage provides a straight axial continuation of said through passage; and removable closure means normally closing said through passage including a threaded portion engaged with the threaded portion of said housing.

2. A tap device as defined in claim 1 wherein said tube member has said longitudinal passages initially formed therein so as to extend through the tube member for the entire length thereof; and plug means disposed in and closing the portion of said gas passage located beyond said port.

3. A tap device as defined in claim 2 wherein said tube member is an extruded product of moldable material having said longitudinal passages molded therein.

4. A tap device as defined in claim 1 wherein the beverage passage of said draft tube extends therethrough from said one end to the other end thereof and includes a beverage inlet port in the side of said draft tube at a point adjacent said other end; and a preformed imperforate and electrically insulating contact member made of plastic material and mounted in a fixed relation on said draft tube at said other end thereof for engagement with an opposite wall of said container; said contact member having a portion thereof engaged in and closing said beverage passage beyond said beverage inlet port.

5. A tap device as defined in claim 1 wherein said housing comprises a valve housing having a valve seat therein in a control location with respect to said beverage discharge passage, and said closure means includes a valve member cooperable with said seat and movable toward and away therefrom to open and closed positions; and actuating means effective on said valve member for moving the same to the open position.

6. A tap device as defined in claim 5 wherein said tube member and valve housing are preformed molded members made of plastic material.

References Cited in the file of this patent

UNITED STATES PATENTS

| | | |
|---|---|---|
| 587,987 | Mills | Aug. 10, 1897 |
| 732,122 | Schneider | June 30, 1903 |
| 842,343 | Schilling et al. | Jan. 29, 1907 |
| 1,406,158 | Crane | Feb. 7, 1922 |
| 1,844,360 | Heston | Feb. 9, 1932 |
| 2,160,043 | Threm | May 30, 1939 |
| 2,310,714 | Slaughter | Feb. 9, 1943 |
| 2,571,433 | Fine et al. | Oct. 16, 1951 |
| 2,768,771 | Beutel | Oct. 30, 1956 |
| 2,770,402 | Quam | Nov. 13, 1956 |
| 2,837,375 | Efford et al. | June 3, 1958 |
| 2,951,646 | Efford et al. | Sept. 6, 1960 |